(12) United States Patent
Dawley et al.

(10) Patent No.: US 6,962,722 B2
(45) Date of Patent: Nov. 8, 2005

(54) HIGH PROTEIN CORN PRODUCT PRODUCTION AND USE

(76) Inventors: Larry J. Dawley, 5632 Oakview, Shawnee, KS (US) 66216; James R. Dawley, 9012 Ginger La., Carthage, MO (US) 64836

( * ) Notice: Subject to any disclaimer, the term of this patent is extended or adjusted under 35 U.S.C. 154(b) by 248 days.

(21) Appl. No.: 10/463,455

(22) Filed: Jun. 17, 2003

(65) Prior Publication Data

US 2003/0232109 A1 Dec. 18, 2003

Related U.S. Application Data

(63) Continuation-in-part of application No. 10/000,319, filed on Dec. 4, 2001, now abandoned.

(51) Int. Cl.⁷ .................................................. A23K 1/06
(52) U.S. Cl. ............................ 426/53; 426/54; 426/624
(58) Field of Search .............................. 426/53, 54, 62, 426/64, 624

(56) References Cited

U.S. PATENT DOCUMENTS

| | | | | |
|---|---|---|---|---|
| 4,828,846 A | * | 5/1989 | Rasco et al. | 426/18 |
| 5,106,634 A | * | 4/1992 | Thacker et al. | 426/31 |
| 5,260,089 A | * | 11/1993 | Thornberg | 426/624 |
| 6,254,914 B1 | * | 7/2001 | Singh et al. | 426/482 |
| 6,261,629 B1 | * | 7/2001 | Mazza et al. | 426/656 |
| 6,509,180 B1 | * | 1/2003 | Verser et al. | 435/161 |
| 6,726,941 B2 | * | 4/2004 | Ethington et al. | 426/2 |
| 2004/0185148 A1 | * | 9/2004 | Said | 426/53 |

FOREIGN PATENT DOCUMENTS

WO         2004/081193      *   9/2004

* cited by examiner

*Primary Examiner*—Keith Hendricks
(74) *Attorney, Agent, or Firm*—Howard J. Greenwald

(57) ABSTRACT

The present invention relates to the production of a highly digestible, high protein product (high protein distillers dried grains or high protein DDG) from corn endosperm, and more particularly to a method for the recovery of high protein DDG by using: (i) dehulling and degermination to isolate a low fat, low fiber corn endosperm fraction, (ii) enzymatic hydrolysis to solubilize and alcoholic fermentation to assimilate the starch and non-starch carbohydrates present in the corn endosperm, and (iii) filtration and/or centrifugation to recover the dealcoholized insoluble solids that remain after fermentation of the corn endosperm. The present invention provides an alternative to the traditional dry mill method of processing corn to produce ethanol, and results in the production and recovery of a distillers' by-product (high protein DDG) with increased value and range of use as an ingredient in feeds for farm-raised ruminants and non-ruminants and pet foods. The product of the present invention contains less than about 2.0 weight percent starch, from about 55.0 to about 65.0 weight percent protein, from about 4.5 to about 7.5 weight percent fat, from about 3.0 to about 5.0 weight percent crude fiber, and from about 78.0 to about 90.0 percent total digestible nutrients, and improves the palatability and digestibility of animal feeds and/or pet foods into which it is incorporated, and aids in the management of the health and weight gain of the animal.

20 Claims, 2 Drawing Sheets

HIGH PROTEIN CORN PRODUCT PRODUCTION AND USE

CROSS-REFERENCE TO RELATED APPLICATION

This application is a continuation-in-part of applicants' patent application U.S. Ser. No. 10/000,319, filed on Dec. 4, 2001 now Abandoned.

FIELD OF THE INVENTION

The present invention relates to the production of a highly digestible, high protein product (high protein distillers dried grains or high protein DDG) from corn endosperm, and more particularly to a method for the recovery of high protein DDG by using: (i) dehulling and degermination to isolate a low fat, low fiber corn endosperm fraction, (ii) enzymatic hydrolysis to solubilize and alcoholic fermentation to assimilate the starch and non-starch carbohydrates present in the corn endosperm, and (iii) filtration and/or centrifugation to recover the dealcoholized insoluble solids that remain after fermentation of the corn endosperm. The present invention provides an alternative to the traditional dry mill method of processing corn to produce ethanol, and results in the production and recovery of a distillers' by-product (high protein DDG) that contains less than about 2.0 weight percent starch, from about 55.0 to about 65.0 weight percent protein, from about 4.5 to about 7.5 weight percent fat, from about 3.0 to about 5.0 weight percent crude fiber, and from about 78.0 to about 90.0 percent total digestible nutrients. The product of the invention is used as an ingredient to improve the palatability and digestibility of animal feeds, particularly for those of the non-ruminant, and/or pet foods, and aid in the management of the health and weight gain of the animal.

BACKGROUND OF THE INVENTION

The processing of corn to produce: (a) protein, fiber and fat-containing ingredients for the feed industry, (b) grits, meals, flours, starches and/or syrups for food manufactures, and (c) binders, film-formers, and adhesives for technical industries is done using either a wet or dry milling process. In the wet-milling process, corn kernels are steeped for 30 to 40 hours in a warm solution of water and sulfur dioxide. During steeping, the corn kernels absorb water (swell) and soften, thereby loosening the matrix that holds the protein, fiber, germ and starch components together. After steeping, the corn is coarsely ground to break the embryo (germ) loose from the other components. The ground corn is then pumped into hydrocyclones that spin the low-density corn germ out of the slurry. The germ is washed to remove excess starch, dried, and further processed with mechanical and/or solvent processes to extract corn oil. The heavy phase/slurry leaving the germ separators is ground more thoroughly in an impact or attrition mill to release the starch and protein from the fiber present in the kernel. The suspension of starch, protein and fiber is then pumped over screens that recover the fiber, but allow starch and protein to pass through. The fiber is washed to remove any residual starch or protein, combined with the defatted germ and concentrated steepwater, and dried to produce corn gluten feed. The starch and protein suspension is then pumped to separators where protein is removed due to its low density compared to starch. The starch is washed to remove the last traces of protein. The protein suspension is dewatered and dried producing a 60.0 percent protein product that the industry refers to as corn gluten meal. The clean starch may then be dried or further processed into sweeteners or fermentation chemicals. Corn wet-milling is a capital-intensive process, but the cost of producing starch for further processing is offset by the sale of the resulting co-products; corn oil, corn gluten feed, and corn gluten meal.

The first step of the dry-milling process entails tempering clean corn with water to 20.0 percent moisture. While moist, the outer bran layer or pericarp, the germ, and tip cap loosen their attachment to and are separated from the starchy endosperm. The majority of the corn endosperm, known as the "tailstock", proceeds through a degerminator, is dried, cooled and sifted. A portion of the endosperm is isolated as large flaking grits. Further separation is accomplished using roller mills, sifters, gravity tables, and aspirators so that an infinite variety of smaller grits, meals, and flours can be produced. The bran and germ are passed through another part of the degerminator as the "throughstock" stream. This stream is dried, sieved, and aspirated to recover the bran. Further processing separates the germ from any remaining endosperm. The "throughstock" produces germ for crude corn oil production; hominy feed; bran products; standard meal; and prime grits, meals, and flours.

Some researchers have developed ways to combine the low cost and speed in which germ, fiber, and endosperm may be separated in corn dry-milling with the efficiency of starch and protein separation provided by corn wet-milling to create a "hybrid" process. For example, U.S. Pat. No. 4,181,748 discloses the dry milling of corn to provide fractions of endosperm, germ, fiber, and cleanings, and the wet milling of the endosperm fraction using two distinct steeping steps to provide a mill starch slurry. In this reference the mill starch slurry is separated into a starch-rich fraction and a protein-rich fraction, and the protein-rich fraction is combined with the germ, fiber, and cleanings fraction from the dry milling process and the offals from starch refining to provide a feed product.

In another reference disclosing the further processing of dehulled and degermed dry milled corn products, U.S. Pat. No. 4,517,022, corn endosperm is slurried with water containing alkali and sodium sulfite, and subjected to high intensity mixing for a period not to exceed four hours. A high quality starch is then recovered.

Due to its availability, relatively low cost, and high starch content, corn also is used as a raw material in the manufacture of fermentation chemicals. Ethanol is one such chemical, and is produced in large volume. Currently, ethanol is produced from corn mainly via two different processes—a wet mill process and a dry-grind process. The wet mill process follows the scheme described above with the resulting clean starch stream undergoing liquefaction, saccharification and fermentation. Ethanol is recovered by distillation and yeast is harvested and sold to feed manufacturers as a source of single cell protein. In the dry-grind process, raw corn is ground to a meal and mixed with water and enzymes. The corn slurry is cooked to gelatinize and liquefy the starch. The cooked slurry or mash is then cooled, a second enzyme is added to saccharify the liquefied starch (producing fermentable sugars), and yeast is added to ferment the sugars as they are processed to ethanol. The fermented mash is then distilled to recover the ethanol. Only starch is fermented to ethanol, the non-fermentable components of the corn (the oil, fiber, and protein) are carried through the process and emerge from distillation in slurry form. This slurry is centrifuged to separate the suspended or insoluble solids from the soluble solids, the insoluble solids being discharged from the centrifuge as a wet cake. The soluble solids are concentrated by evaporation, combined with the wet centrifuged solids, and dried together to produce distillers dried grains with solubles, or DDGS.

A derivation of the dry-grind ethanol process is disclosed in U.S. Pat. Nos. 4,407,955 and 4,448,881. Starch derived from a dry milled cereal grain (the starch in the form of corn endosperm) is hydrolyzed to provide a sterile aqueous fermentable sugar solution. Following an initial hydrolysis to liquefy the starch, substantially all of the water insoluble protein and oil components and a portion of the water-soluble components, e.g. sugars, lipids, proteins, and vitamins, are separately recovered from the hydrolyzate either before or after further hydrolysis of the liquefied starch to provide an aqueous solution of fermentable sugar. Unlike the traditional dry-grind ethanol process the insoluble, non-starch solids are removed prior to fermentation and do not contain yeast and yeast cell fragments, and the resulting minerals, vitamins, and unidentified growth factors contributed by the yeast to the DDGS.

Distillers dried grains with solubles (DDGS) contribute significantly to the economics of the dry-grind ethanol production process. Approximately 16.0 to 18.0 pounds of DDGS are produced from each bushel of corn processed. Its sale enables the ethanol producer to take a credit of $0.85 to $0.90 per bushel against his purchase price of corn. Distillers dried grains with solubles (DDGS) contains 3.5 times the protein (60.0 percent of which is by-pass protein in the rumen digestive system), 5.0 times the fiber (much of which has been made digestible for the rumen digestive system by the features of the process), and 7.0 times the fat of the starting corn. Approximately 85.0 percent of the DDGS produced is used as an ingredient in feeds for dairy cattle. Turkey, swine, and beef cattle represent expanding, but secondary markets for DDGS.

A significant amount of research has been conducted by animal nutritionists to demonstrate that DDGS produced by dry-grind ethanol production facilities may replace a portion of the corn, soybean meal, and calcium now used to formulate feeds for swine, poultry and beef cattle. The results of this research are that DDGS may be used, up to a certain level, but its selling price must stay in the range of $85 to $100 per ton to provide an incentive for its use. One of the limitations to the greater use of DDGS is its high non-starch carbohydrate content. Non-starch carbohydrates are the primary components of the cell wall, the hull, of cereal grains and are relatively resistant to breakdown by the digestive system of non-ruminants (swine, poultry, fish and pets). This prevents the nutrients entrapped within the cells of many grains and by-products of grain processing from being nutritionally available to the animal.

Enzymes are now being added to feeds to improve their digestibility and nutritional performance. U.S. Pat. Nos. 5,612,055 and 6,162,473 disclose methods to increase the efficiency with which monogastric animals utilize diets containing cereals and cereal by-products. The addition of hemicellulase, protease, and/or beta-glucanase enzymes to the rations increases the efficiency with which monogastric animals utilize the rations (the amount of feed consumed relative to the weight of the animal is reduced).

Other researchers have explored the prospect of further processing DDGS to increase its protein and decrease its fiber content. Wu and Stringfellow (Journal of Food Science 1982. Volume 47: 1155–1157) reported that pin milling and sieving may be used to isolate a high protein fraction from DDGS. Corn DDGS at 21.0 and 30.0 percent initial moisture protein, respectively, can be ground twice at 14,000 rpm and separated with a 50 mesh screen to obtain a fraction with 43.0 percent protein content in 41.0 percent yield.

There are no reports of a method that entails the dehulling and degerminating of corn to recover low fat, low fiber endosperm at the greatest yield possible (achieved by combining the large, medium and small grits, and the meal and flour streams produced during degermination of corn), and the use of enzymatic hydrolysis to solubilize and alcoholic fermentation to assimilate the starch and non-starch carbohydrates present in this corn endosperm in order to produce a highly digestible, high protein product (high protein distillers dried grains or high protein DDG). Additionally, there have been no reports of a method to produce a high protein DDG that is further characterized by its overall low fiber content (crude, acid detergent and neutral detergent fiber combined). Furthermore, there have been no reports of a method combining mechanical removal of corn fiber (bran) and enzymatic hydrolysis and alcoholic fermentation of non-starch carbohydrates to produce high protein DDG and the subsequent use of that high protein DDG as an ingredient in feeds for farm-raised ruminants and non-ruminants and in pet foods to improve the palatability and digestibility of animal feeds and/or pet foods, and aid in the management of the health and weight gain of the animal. It is an object of this invention to provide such a method and to also provide the composition produced by such method.

SUMMARY OF THE INVENTION

In accordance with this invention, there is provided a method for the production of a highly digestible, high protein product (high protein distillers dried grains or high protein DDG) from corn endosperm, and more particularly to a method for the recovery of high protein DDG by using: (i) dehulling and degermination to isolate a low fat, low fiber corn endosperm fraction, (ii) enzymatic hydrolysis to solubilize and alcoholic fermentation to assimilate the starch and non-starch carbohydrates present in the corn endosperm, and (iii) filtration and/or centrifugation to recover the dealcoholized insoluble solids that remain after fermentation of the corn endosperm. The present invention provides an alternative to the traditional dry mill method of processing corn to produce ethanol, and results in the production and recovery of a distillers' by-product (high protein DDG) that contains less than about 2.0 weight percent starch, from about 55.0 to about 65.0 weight percent protein, from about 4.5 to about 7.5 weight percent fat, from about 3.0 to about 5.0 weight percent crude fiber, and from about 78.0 to about 90.0 percent total digestible nutrients. The product of the invention is used as an ingredient to improve the palatability and digestibility of animal feeds, particularly for those of the non-ruminant, and/or pet foods, and aid in the management of the health and weight gain of the animal.

BRIEF DESCRIPTION OF THE DRAWINGS

The preferred embodiments of the invention will be described by reference to the following drawings, in which like numerals refer to like elements, and wherein.

DESCRIPTION OF THE PREFERRED EMBODIMENTS

Figure 1:
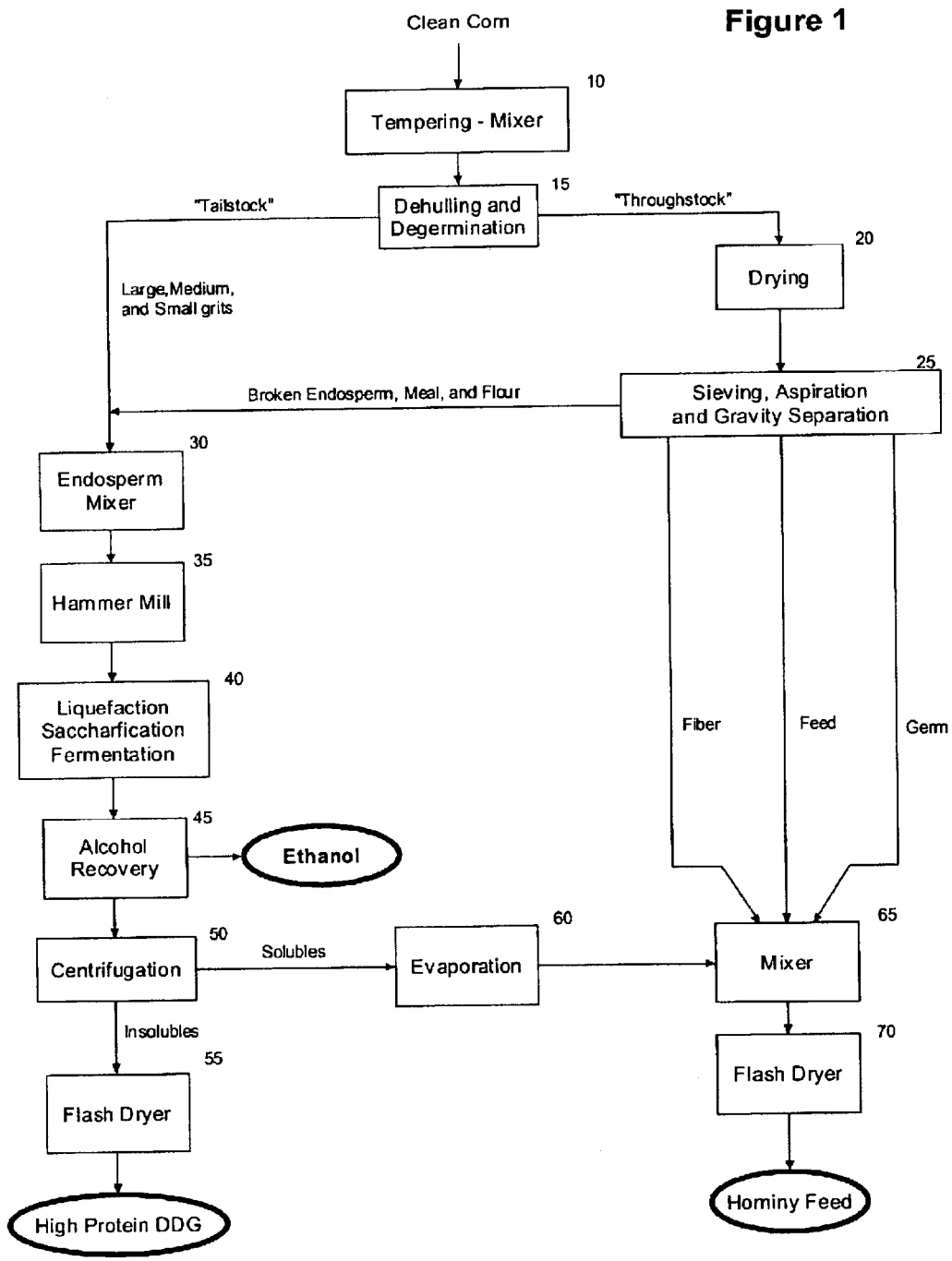
FIG. 1 is a schematic diagram depicting the preferred method of dry milling (dehulling and degerminating) corn to maximize the recovery of endosperm and the subsequent fermentation of the endosperm to produce the product of the invention (high protein DDG)

The present invention, in one of its embodiments, relates to a process for preparing a highly digestible, high protein product (high protein distillers dried grains or high protein DDG) from corn that is used as an ingredient in feeds for farm-raised ruminants or non-ruminants, or as an ingredient in pet foods. The high protein DDG results from recovering the insoluble solids that remain after the alcoholic fermentation and/or solubilization and separation of the starch and non-starch carbohydrates present in the endosperm fraction of dry-milled corn. This endosperm fraction is a high starch, low fat, low fiber component comprised of the large, medium and fine grits, and the meal and flour generated during the dehulling and degermination of corn. The product of the invention is used to improve the palatability and digestibility of animal feeds and/or pet foods, and manage the health and weight gain of a farm-raised ruminant, farm-raised non-ruminant, or pet.

In another embodiment, the invention pertains to a highly digestible, high protein product (high protein distillers dried grains or high protein DDG) that is produced through the alcoholic fermentation of corn endosperm (a high starch, low fat, low fiber fraction obtained from the dehulling and degerminating of corn), and the subsequent use of the high protein DDG as an ingredient in animal feeds for farm-raised ruminants and non-ruminants and in pet foods. The process for producing the high protein DDG comprises the steps of: (a) conditioning and tempering corn in water to loosen the attachment of the fractions consisting of the endosperm from the germ from the pericarp (hull); (b) dehulling and degerminating the tempered corn to separate endosperm from the germ from the pericarp (hull) and recovering the endosperm in high yield, keeping the large, medium and fine grits, and the meal and flour generated during degermination as a single distinct fraction; (c) enzymatic hydrolysis to solubilize and alcoholic fermentation to assimilate the starch and non-starch carbohydrates present in the corn endosperm; (d) removing the alcohol produced during the fermentation and separating the solids that remain into an insoluble solids and soluble solids fraction, and; (e) recovering and drying the insoluble solids to produce the product of the invention, high protein DDG.

The composition of high protein DDG is different from that of DDG and other distillers' co-products produced from the traditional dry mill ethanol production process, which are obtained through the fermentation of the starch present in whole, ground corn. Whereas, DDG produced in the traditional dry mill ethanol process has a: (a) protein content of from about 27.0 to about 30.0 percent, (b) fat content of from about 9.0 to about 12.0 percent, and (c) crude fiber content of from about 7.5 to 9.5 percent, the product of this invention, high protein DDG has a: (a) protein content of from about 55.0 to about 65.0 weight percent, (b) fat content of from about 4.5 to about 7.5 weight percent, and (c) crude fiber content of from about 3.0 to about 5.0 weight percent. Unlike the DDG produced from the traditional dry mill ethanol production process, which contains a large amount, as much as 35.0 percent of its dry weight, of non-starch carbohydrates (cellulose and arabinoxylans—measured as neutral detergent fiber), high protein DDG is produced employing processing steps that mechanically removes and enzymatically hydrolyzes the non-starch carbohydrates making high protein DDG more palatable and digestible to the non-ruminant.

In accordance with this discovery, it is an object of the invention to provide a novel method for producing a highly digestible, high protein product (high protein DDG) from corn. An additional object is to provide a method for producing high protein DDG through the fermentation of a high starch, low fat, low fiber material (corn endosperm) produced from the dehulling and degermination of corn.

An additional object of the invention is to provide a method that employs enzymatic hydrolysis to solubilize and alcoholic fermentation to assimilate the starch and non-starch carbohydrates present in the endosperm fraction isolated from corn.

Another object of the invention is to produce a high protein product (high protein DDG) from corn that is low in crude fiber, low in acid detergent fiber, and low in neutral detergent fiber, and is readily digested by animals possessing either a rumen or monogastric digestive system.

A further object of the invention is to use high protein DDG as an ingredient in animal feeds and pet foods, providing both a source of energy and protein, to improve the palatability and digestibility of animal feeds and/or pet foods, and manage the health and weight gain of a farm-raised ruminant, farm-raised non-ruminant, or pet.

Still another object of the method is to provide a process for producing a high value co-product (the high protein DDG) during the production of ethanol from corn, such a co-product, when added to the other co-products capable of being produced from the invention (i.e., corn oil, food-grade corn bran, hominy feed, corn germ, corn fiber oil, and corn fiber gum) and the end-product ethanol, which all have value in the marketplace, will lessen the impact rising corn and energy prices have on the economic viability of corn processing.

Other objects of the present invention will be discussed or will become apparent from the following description.

One preferred method for producing a highly digestible, high protein product (high protein distillers dried grains or high protein DDG) from an endosperm fraction of dry milled corn is illustrated in FIG. 1.

Referring to FIG. 1, cleaned, conditioned corn (preferably hard endosperm yellow or white corn) is fed from storage to mixer 10 for tempering. Preferably, water at ambient temperature is sprayed onto the surface of the kernels to adjust the moisture content of the cleaned corn from about 12.0 to 15.0 percent to between 17.0 and 20.0 percent. It also is preferred that mixer 10 be operated in such a manner that the residence time for the corn (the tempering period) be for a period of from 10 minutes to 2 hours, and more preferably for a period of time less than 20 minutes. Conditioning, followed by a short period of intensive tempering that: (i) causes the bran coat to separate (peel away) from the vitreous part (the endosperm) of the kernel, (ii) facilitates the separation of germ by making it soft and elastic, thereby preventing it from breaking apart during degermination and adding fat to the endosperm fraction, (iii) reduces the amount of flour produced during degermination, and (iv) obtains the best yield of high starch, low fat, low fiber endosperm.

Referring again to FIG. 1, after tempering the corn kernels are fed into dehulling and degermination device 15 (such devices are manufactured by, but not limited to the impact or conical maize degerminator of Ocrim spa, the vertical maize degerming machine (VBF) of Satake Corporation, and the Beall degerminator of the Beall Degerminator Company) where impact, abrasion, or shearing action separates the endosperm (starch containing) fraction from the germ (oil containing) fraction from the pericarp (bran) fraction. Recovery of the various fractions is done according to their physical characteristics (particle size and density). The coarsest fraction contains large, medium and small particles of endosperm (as measured by their collection on screens ranging in size from 3.5 wire to 14.0 wire), is essentially free of germ, and is aspirated to remove bran and dust. The corn dry-milling industry often refers to the endosperm fraction isolated as large particles as the "tailstock".

Compared to the endosperm fraction or tailstock, the particles that comprise the germ and pericarp fractions are smaller in size and lighter in weight. The corn dry-milling industry refers to this fraction as the "throughstock". It should be noted that the separation and recovery of endosperm from dehulling and degermination device 15 is rarely 100.0 percent, and portions of broken endosperm and endosperm that are loosely attached to the germ (mostly in the form of meal or flour) end up being present in the throughstock. The germ and preicarp fractions absorb most of the water during the tempering process. The moisture content of the throughstock must be lowered from 22.5 to 25.0 percent to between 12.0 and 15.0 percent prior to any further processing and is done so in dryer 20. After drying, the throughstock is subjected to sieving, aspiration and gravity separation 25 to remove additional quantities of endosperm and generate distinct streams containing germ, fiber, and feed, the latter material comprising fine particles of endosperm, germ, and fiber. The germ, fiber, and feed streams are collected and mixed with the solubles generated by the accompanying ethanol process 65 and dried in flash dryer 70 to produce hominy feed, the by-product of the process of the invention.

The endosperm fraction containing large, medium, and small grits (the tailstock) is combined with the broken endosperm, meal and flour isolated from the refining of the throughstock in endosperm receiver/mixer 30. The total amount of endosperm recovered by the process of the invention is not less than 65.0 percent, and preferably more than 70.0 percent, of the starting material (corn). The total endosperm fraction isolated and recovered by the process of the invention has a fat content from about 0.60 to about 1.10 weight percent and a crude fiber content from about 0.40 to about 0.80 weight percent.

The total endosperm fraction of the process is fed into milling device 35 (a hammer mill) to produce a meal that possesses a range of particle sizes that facilitates fermentation (ethanol yield) and recovery of the solids that remain after fermentation, preferably the total endosperm fraction is ground so that all particles pass a 20 mesh screen. The ground endosperm fraction is then subjected to liquefaction/saccharification/fermentation 40; a process that encompasses: (a) the preparation of a slurry or mash, accomplished by adding, under vigorous agitation, the ground endosperm to recycled process water and/or fresh water (b) cooking of the slurry or mash at a temperature of at least 95 degrees Celsius to gelatinize the starch, (c) the addition of a liquefying enzyme (commercially available alpha amylase, preferably selected from those that function at high temperature, low pH, and require low levels of calcium) to solubilize the starch present in the ground endosperm, (d) the addition of saccharifying enzymes (any commercially available glucoamylase marketed for use in fuel and beverage-grade ethanol production, and an enzyme preparation possessing a range of activities that includes, but is not limited to, cellulase, xylanase [hemicellulase], and beta-glucanase) to produce fermentable sugars from the starch and solubilize the non-starch carbohydrates present in the endosperm, and (e) the addition of a distillers yeast (belonging to the family of *Saccharomyces* sp. or *Candida* sp.) or a fermentative bacterium (*Zymomonas mobilis*) to convert the fermentable sugars to ethanol.

The fermented mash from alcoholic fermentation 40 is then transferred to alcohol recovery 45 where physical separation methods such as distillation and dehydration or membrane filtration (pervaporation) and dehydration are employed to recover ethanol. The slurry that remains after alcohol recovery contains non-fermentable solids. These solids are insoluble (suspended) and soluble (dissolved) in nature. The slurry is processed through centrifugation device 50 (preferably a decanter centrifuge, but a screw press or filter press also may be used) to separate the insoluble solids (including spent yeast) from the soluble solids. The suspended or insoluble material is recovered by device 50 at a solids content not less than 25.0 percent and are conveyed to dryer 55 (such as a flash, fluidized bed, or rotary dryer) and dried to an 8.0 to 10.0 percent moisture content to generate the product of the invention (high protein DDG). The product of the invention has a: (a) protein content of from about 55.0 to about 65.0 weight percent, (b) fat content of from about 4.5 to about 7.5 weight percent, (c) crude fiber content of from about 3.0 to about 5.0 weight percent, and (d) total digestible nutrient value of from about 78.0 to about 90.0 percent.

The soluble solids remaining after recovery of the insoluble material are concentrated in evaporator 60, transferred to mixer 65 where they are blended with the germ, fiber, and feed fractions generated during dehulling and degermination of the corn, and processed in drier 70 (a flash dryer) to produce a dried product. The corn processing industry often refers to this type of material as hominy feed.

Figure 2:
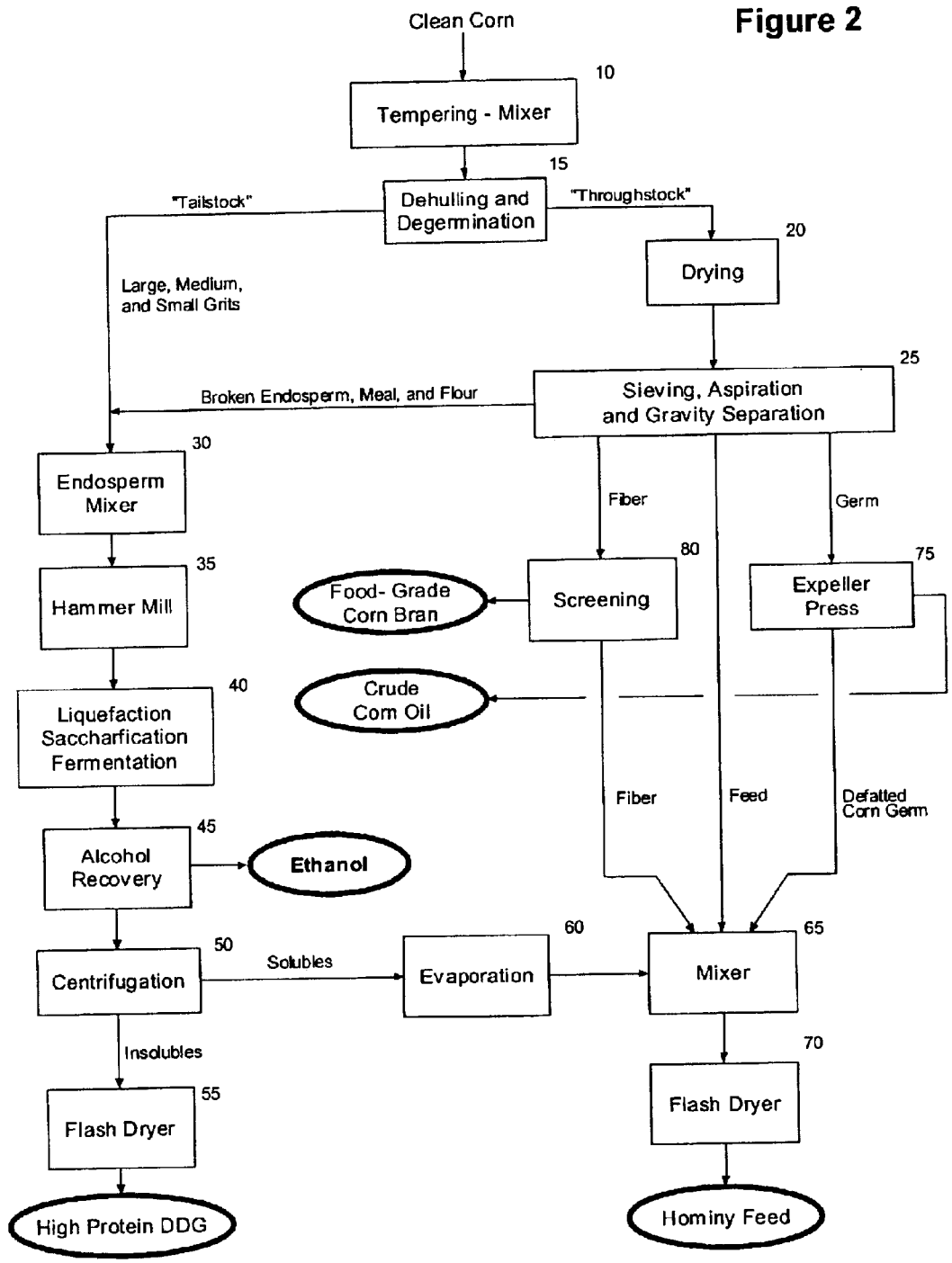
FIG. 2 is a schematic diagram illustrating a modification to the method shown in FIG. 1 and showing how the production of high value co-products may be increased with no impact on the yield or quality of the product of the invention (high protein DDG).

FIG. 2 depicts a modified version of the method described in FIG. 1. The primary difference between the modified method of FIG. 2 and that of FIG. 1 relates to the further processing of the throughstock fraction in order to produce additional co-products from the process of the invention. Much interest exists in improving the economics of manufacturing ethanol from corn in a dry milling process so businesses that employ the corn dry mill ethanol process remain viable during periods of increasing corn and energy prices. Most developmental efforts have focused on the isolation, recovery and sale of the non-fermentable components of the grain. In the FIG. 2 method, the germ isolated during sieving, aspiration and gravity separation 20 is subjected to expeller pressing 75 (such equipment is offered by Anderson International Corporation or French Oil Machinery Company) to produce crude corn oil. The crude corn oil may be sold to edible oil refiners in the domestic and export market. Additionally, in the FIG. 2 method, the fiber isolated during sieving, aspiration and gravity separation 20 is subjected to screening 80 to withdraw a stream that possesses a high dietary fiber content, minimum of 80.0 percent on a dry substance basis. This material is marketed as food-grade corn bran and may be used in a myriad of products such as breakfast cereals, snack foods, baked goods, and dietary or nutritional supplements.

Compared to the distillers' co-products produced by the prior art, the process of this invention produces a product (high protein DDG) that is far superior in meeting not only the nutritional requirements of farm-raised ruminants (dairy and beef cattle), but also those of the farm-raised non-ruminant (swine, poultry, and fish) and domestic pet (dog and cat). The stellar properties of high protein DDG are a function of its high digestibility, high protein content (over twice that of DDG produced by plants using the traditional corn dry mill ethanol process), high availability of amino acids (particularly methionine), low fiber content (approximately one third of the crude plus acid plus neutral detergent fiber of that found in the DDG produced by plants using the traditional corn dry mill ethanol process), and high yeast content (near twice that of DDG produced by traditional dry mill ethanol plants—contributing more minerals, B vitamins and growth stimulating factors to the animal feeds or pet foods to which it is added). The process of the present invention allows for the production of up to four co-products, plus ethanol, during the fermentation of corn, compared to just one co-product, DDG, plus ethanol, when using the traditional dry mill ethanol process. The economic viability of producing ethanol in a corn dry mill process is significantly improved with the process of the present invention. Economic analysis has shown that the process of the present invention has the potential to increase the revenues of dry mill ethanol production by $0.30 to $0.40 per bushel of corn processed.

In one embodiment, the high protein product of this invention contains at least about 55.0 weight percent of protein, as determined by AACC (American Association of Cereal Chemists) standard test 46-30. It is preferred that protein comprise from about 55.0 to about 65.0 weight percent of the composition. In one preferred embodiment, protein comprises from about 55.0 to about 65.0 weight percent of the composition. In another embodiment, the composition is comprised of from about 57.5 to 65.0 weight percent of protein.

In one embodiment, the composition of this invention contains from about 3.0 to about 5.0 weight percent of crude fiber. In one aspect of this embodiment, such composition contains from about 3.0 to about 4.5 weight percent of crude fiber. In another embodiment, the composition contains from about 4.0 to about 5.0 weight percent of crude fiber. The concentration of crude fiber may be determined in accordance with AACC Approved Method 32-10.

In one embodiment, the composition of this invention contains from about 4.5 to about 7.5 weight percent of fat. In one embodiment, the composition comprises from about 6.0 to about 7.5 weight percent of fat. The concentration of fat in the composition may be determined in accordance with AACC Approved Method 30-20.

In one embodiment, the composition of this invention is comprised of from about 4 to about 12 weight percent of yeast bodies. As used in this specification, the term yeast bodies refers to yeast cells, yeast cell fragments, and mixtures thereof. The yeast bodies are preferably derived from the yeast used in the alcoholic fermentation of the starch and non-starch carbohydrates present in the endosperm. These yeast cells and/or yeast cell fragments are standard yeasts used by the distilling and brewing industry and may belong to, e.g., the genus *Saccharomyces* or *Candida*.

In one preferred embodiment, the composition of this invention has a total digestible nutrient (TDN) value greater than 78 percent. The TDN value is equal to the sum of the percentage of the digestible carbohydrates, the sum of the digestible protein, and 2.25 times the percentage of digestible fats.

In one aspect of this embodiment, the total digestible nutrient value of the high protein corn product is from about 78.0 to about 90.0 percent.

The following examples are presented to illustrate the claimed invention but are not to be deemed limitative thereof. Unless otherwise stated, all parts are by weight and all temperatures are in degrees Centigrade.

Studies were performed to evaluate various corn varieties and qualify them for processing and determine the optimum conditions for dehulling and degerminating corn to recover the greatest quantity of low fat, low fiber endosperm. Experiments also were performed to identify those conditions (enzyme types and their addition points) during liquefaction, saccharification and fermentation of the endosperm that would result in the greatest yield of and highest protein content for the product of the invention (high protein DDG).

EXAMPLE 1

Four hundred (400) pounds of cleaned white corn with an as received moisture, fat, protein, crude fiber, and starch content of 12.3%, 3.7%, 9.3%, 2.4%, and 60.3%, respectively, were transferred to a mixing vessel where water was added to increase the moisture content to 18.5 percent. The mixture was slowly agitated for 15 minutes, after which the corn was withdrawn and dehulled and degerminated.

An endosperm fraction (the "tailstock"—the high starch, low fat, low fiber component comprised of large, medium, and fine grits, and the meal and flour), representing 286 pounds of the starting material, was collected. The endosperm fraction was ground in a hammer mill until substantially all of its particles would pass a U.S. 20 mesh screen. The ground endosperm fraction was analyzed and found to contain, on a moisture free basis, fat, crude fiber, protein, and starch at 1.03%, 0.41%, 9.34%, and 80.03%, respectively.

One hundred twenty five (125) pounds of the ground endosperm and 213 liters of water were mixed together to create a mash. The mash was heated and, as the temperature approached 60 degrees Celsius, alpha amylase was added to begin the liquefaction process. The mash was eventually heated to a temperature of 95 degrees Celsius and held at this temperature for a period of 60 minutes. After completion of liquefaction, as indicated by an iodine test, the temperature of the mash was lowered to 25 degrees Celsius, the pH adjusted to 4.0, and glucoamylase and yeast added to initiate the fermentation process. When fermentation reached completion, the fermented mash was heated to remove ethanol and subsequently centrifuged using a decanter to separate the solids that remained into fractions comprised of suspended (insoluble) solids and dissolved (soluble) solids. Each of these fractions was dried. Analysis of the suspended (insoluble) solids fraction, the product of the invention, showed the composition to contain, on a moisture free basis, fat, crude fiber, protein, and total digestible nutrients of 7.3%, 4.5%, 63.6%, and 85%, respectively.

EXAMPLE 2

The fermentation process of Example 1 was repeated using the same ground endosperm fraction, with the exception that the liquefaction/saccharification/fermentation process was amended to include the addition of a commercial cellulase enzyme preparation. Analysis of this enzyme preparation showed it to be capable of hydrolyzing or rendering soluble a number of non-starch carbohydrates, including cellulose and hemicellulose. Analysis of the insoluble solids fraction (the high protein DDG) generated in this Example showed the protein content of the product to be 68.9%, on a moisture free basis. Other embodiments of the process and product of this invention will be apparent to those skilled in the art.

Thus, by way of illustration, high milk and high milk fat production achieved by dairy cattle and the improvements in feed efficiency and weight gain realized by beef cattle are attributable to the formulation of feeds that contain ingredients with high energy and bypass protein, excellent overall digestibility, and that stimulate the health and performance of the rumen digestive system. A high performance, low cost feed for dairy cattle that utilizes high protein DDG in its ingredient slate may be prepared with the following components:

| Ingredient | Percent of Composition |
| --- | --- |
| Corn | 70 |
| Soybean Meal | 11.3 |
| High Protein DDG | 10 |
| Meat and Bone/Blood Meal | 4.6 |
| Tallow | 1.1 |
| Calcium Phosphate | 1.6 |
| Magnesium Oxide | 0.2 |
| Salt | 0.6 |
| Vitamin/Mineral Mix | 0.3 |

By way of further illustration, the formulation of diets for swine is a compromise between the selection of ingredients that meet the energy, protein, and mineral requirements of the animal at that point in its growth, at the lowest cost possible, and practical considerations, particularly control over the composition and quantity of waste generated by the animal. General formulas (% of composition) that incorporate high protein DDG and may be used in feeding swine include the following:

| Ingredient | Nursery Diet | Finishing Diet |
| --- | --- | --- |
| Corn | 46 | 78 |
| Soybean Meal | 23 | 15 |
| Whey | 15 | — |
| Fish Meal | 6 | — |
| High Protein DDG | 5 | 5 |
| White Grease | 2.2 | — |
| Calcium Phosphate | 1 | 0.55 |
| Limestone | 0.5 | 0.75 |
| Salt | 0.3 | 0.3 |
| L-Lysine | 0.15 | 0.15 |
| DL-Methionine | 0.10 | — |
| Vitamin/Mineral Mix | 0.75 | 0.25 |

By way of yet further illustration, poultry rations are formulated to optimize reproductive performance, feathering, growth, and either egg production or meat quality at the lowest cost possible. The digestibility of and unidentified growth and health factors present in high protein DDG help achieve these objectives. General formulas (% of composition) that incorporate high protein DDG and may be used in poultry diets include the following:

| Ingredient | Layer Hen Diet | Turkey Diet (5–8 Weeks) |
| --- | --- | --- |
| Corn | 62 | 60.1 |
| Soybean Meal | 20 | 20.5 |
| Poultry Meal | — | 8 |
| High Protein DDG | 4 | 6 |
| White Grease | 2.5 | 2 |
| Limestone | 8.5 | 0.75 |
| Calcium Phosphate | 1.15 | 1 |
| Salt | 0.35 | 0.05 |
| Choline Chloride | 0.50 | 0.15 |
| Vitamin/Mineral Mix | 1 | 0.75 |
| L-Lysine | — | 0.40 |
| Threonine | — | 0.10 |
| DL-Methionine | — | 0.20 |

By way of yet further illustration, the formulation of diets for farm-raised fish and crustaceans is often a compromise between the availability and cost of ingredients and practical considerations. The primary objective is to produce a feed that is: (i) nutritionally balanced to support maintenance, growth, reproduction and health, (ii) economical, (iii) palatable, (iv) water stable, and (v) minimizes waste output and effect on water quality. General formulas (% of composition) that incorporate high protein DDG and may be used in aquaculture diets include the following:

| Ingredient | Catfish Formula | Shrimp Formula | Tilapia Formula |
| --- | --- | --- | --- |
| Corn | 23 | 19 | 44 |
| Wheat Middlings | 22 | — | — |
| Wheat Flour | — | 20.75 | — |
| Soybean Flour | — | — | 27 |
| Fish Meal | 4 | 12.5 | 6 |
| Soybean Meal | 31.8 | 30 | — |
| Meat and Bone/Blood Meal | 4 | — | — |
| High Protein DDG | 12.5 | 7.5 | 16 |
| Oil/Fat | 1.5 | — | 4 |
| Calcium Phosphate | 1.0 | — | — |
| Vitamin/Mineral Mix | 0.2 | 0.25 | 3 |
| Binder | — | 10 | — |

Although various embodiments of the present invention have been shown and described, it should be understood that other modifications, substitutions, and/or alternatives may be apparent to one skilled in the art. Such modifications, substitutions, and/or alternatives may be made without departing from the spirit and scope of the invention, which should be determined from the appended claims.

We claim:

1. An animal feed composition that is comprised of from about 1.5 to about 20.0 weight percent of a high protein distillers dried grains (DDG), wherein said high protein DDG is produced as a result of recovering the insoluble solids that remain after the enzymatic hydrolysis and alcoholic fermentation of the starch and non-starch carbohydrates present in the endosperm fraction of dry-milled corn; and wherein said high protein DDG has a: (a) starch content less than about 2.0 weight percent, (b) protein content of from about 55.0 to about 65.0 weight percent, (c) fat content of from about 4.5 to about 7.5 weight percent, (d) crude fiber content of from about 3.0 to about 5.0 weight percent, and (e) a total digestible nutrient value of from about 78.0 to about 90.0 percent.

2. The animal feed composition as recited in claim 1, wherein said animal feed composition is comprised of from about 2.5 to about 20.0 weight percent of said high protein DDG.

3. The animal feed composition as recited in claim 1, wherein said animal feed composition is comprised of from about 2.5 to about 15.0 weight percent of said high protein DDG.

4. The animal feed composition as recited in claim 1, wherein said animal feed composition is comprised of from about 1.5 to about 10.0 weight percent of said high protein DDG.

5. The animal feed composition as recited in claim 1, wherein said high protein DDG is comprised of from about 57.5 to about 65.0 weight percent of protein, from about 3.0 to about 4.5 weight percent crude fiber, from about 6.0 to about 7.5 weight percent fat, and wherein said high protein DDG has a total digestible nutrient value of from about 80 to about 87.5 percent.

6. The animal feed composition as recited in claim 1, wherein said endosperm fraction used to produce said high protein DDG is derived from the dry-milling of a corn variety selected from the group consisting of yellow dent, hard endosperm yellow, white, flint, high amylose, and waxy corn.

7. The animal feed composition as recited in claim 1, wherein said endosperm fraction used to produce said high protein DDG is derived from the dry-milling of a single variety or mixture of two or more varieties of yellow dent and/or hard endosperm yellow corn.

8. The animal feed composition as recited in claim 1, wherein said endosperm fraction used to produce said high protein DDG is derived from the dry-milling of a single variety or mixture of two or more varieties of flint and/or white corn.

9. The animal feed composition as recited in claim 1, wherein said step high protein DDG is produced by a process comprising the steps of: (a) tempering clean, conditioned corn in water to loosen the attachment of the fractions consisting of the endosperm from the germ from the pericarp (hull), (b) dehulling and degerminating or decorticating said tempered corn to separate said endosperm from the germ from the pericarp (hull), (c) recovering said endosperm from the germ from the pericarp (hull), keeping as a single distinct fraction the large, medium and fine grits, and the meal and flour generated during said degermination or decortication of corn, (d) liquefying, saccharifying, and/or solubilizing the starch and non-starch carbohydrates present in said endosperm fraction, (e) performing an alcoholic fermentation using the fermentable sugars generated by the liquefaction, saccharification, and/or solubilization of the starch and non-starch carbohydrates present in said endosperm fraction, (f) removing the alcohol produced from said alcoholic fermentation, (g) separating the solids that remain after said alcoholic fermentation and/or solubilization of starch and non-starch carbohydrates and said alcohol recovery into an insoluble solids and soluble solids fraction, (h) recovering said soluble solids fraction and drying said soluble solids fraction with the pericarp (hull) and/or germ generated during said dehulling and degermination or decortication of corn, and (i) recovering said insoluble solids fraction and drying said insoluble solids fraction to produce said high protein DDG.

10. The animal feed composition as recited in claim 9, wherein said step of tempering clean, conditioned corn, as part of the process to produce said high protein DDG, is done with water at ambient temperature to increase the moisture content of the corn from a range of about 12.0 to about 15.0 weight percent, to a range of about 17.0 to about 20.0 weight percent.

11. The animal feed composition as recited in claim 11, wherein said step of tempering clean, conditioned corn, as part of the process to produce said high protein DDG, is done with water at ambient temperature for a period of from about 0.167 to about 2.0 hours.

12. The animal feed composition as recited in claim 11, wherein said step of dehulling and degermination or decortication of corn, as part of the process to produce said high protein DDG is done with machinery that through impaction, abrasion, and/or shearing separates said tempered corn into fractions comprising endosperm, germ and pericarp (hull).

13. The animal feed composition as recited in claim 9, wherein said step of recovering endosperm from the germ and from the pericarp (hull), as part of the process to produce said high protein DDG, is performed by sieves or screens, gravity tables, and/or aspirators, and wherein said recovered endosperm contains, as a single distinct fraction, all of the large, medium, and small grits, and the meal and flour generated during said dehulling and degerminating or decorticating of corn.

14. The animal feed composition as recited in claim 11, wherein said recovered endosperm, as part of the process to produce said high protein DDG, represents from about 65.0 to about 80.0 weight percent of said tempered corn.

15. The animal feed composition as recited in claim 11, wherein said recovered endosperm, as part of the process to produce said high protein DDG, has a fat content from about 0.60 to about 1.10 weight percent and a crude fiber content from about 0.40 to about 0.80 weight percent.

16. The animal feed composition as recited in claim 9, wherein said liquefaction, saccharification and/or solubilization of the starch and non-starch carbohydrates present in said endosperm, as part of the process to produce said high protein DDG, is performed by an acid-acid, acid-enzyme, or enzyme-enzyme process.

17. The animal feed composition as recited in claim 9, wherein said liquefaction, saccharification and/or solubilization of the starch and non-starch carbohydrates present in said endosperm, as part of the process to produce said high protein DDG, is performed via an enzyme-enzyme process with enzymes selected from the group consisting of amylases, glucoamylases, cellulases, hemicellulases, beta-glucanases, and mixtures thereof.

18. The animal feed composition as recited in claim 9, wherein said alcoholic fermentation of the fermentable sugars obtained from the liquefaction, saccharification and/or solubilization of the starch and non-starch carbohydrates present in said endosperm, as part of the process to produce said high protein DDG, is performed by a single or mixed culture of either yeast or bacteria.

19. The animal feed composition as recited in claim 9, wherein the recovery of said insoluble solids that remain after said alcoholic fermentation and said alcohol recovery, as part of the process to produce said high protein DDG, is performed by sedimentation, filtration, centrifugation, or combinations thereof.

20. The animal feed composition as recited in claim 9, wherein said insoluble solids that remain after said alcoholic fermentation and said alcohol recovery, as part of the process to produce said high protein DDG, are dried in a dryer selected from the group consisting of a spray dryer, flash dryer, ring dryer, freeze dryer, vacuum dryer, rotary gas-fired dryer and rotary steam-tube dryer.

* * * * *